March 29, 1960     N. A. ALLAN     2,930,648
FISHING GAFFS

Original Filed Nov. 10, 1954     2 Sheets-Sheet 1

INVENTOR.
NORMAN A. ALLAN
BY
ATTORNEYS

March 29, 1960 N. A. ALLAN 2,930,648
FISHING GAFFS

Original Filed Nov. 10, 1954 2 Sheets-Sheet 2

INVENTOR.
NORMAN A. ALLAN
BY
ATTORNEYS

United States Patent Office 2,930,648
Patented Mar. 29, 1960

2,930,648

FISHING GAFFS

Norman A. Allan, Montoursville, Pa., assignor to Mann Edge Tool Company, Lewistown, Pa., a corporation of Pennsylvania Continuation of abandoned application Serial No. 468,023, November 10, 1954. This application March 24, 1958, Serial No. 723,273

3 Claims. (Cl. 294—26)

This invention relates to fishing equipment and more particularly and specifically to a gaff for landing and boating fish.

This application is a continuation application of my copending application, Serial No. 468,023, filed November 10, 1954, now abandoned.

Heretofore it has been the general practice of anglers and game fishermen to employ nets or gaff hooks to assist in landing or boating fish which have been caught on usual hook and line tackle. The use of prior known nets and hooks in the gaffing and landing of fish has been unsatisfactory because of the awkwardness and clumsiness of these prior devices in use and because of the inherent lack of absolute reliability of these devices in preventing the loss of a hooked fish.

The present invention has as a general object the provision of a new and improved gripping gaff for landing or boating fish which substantially eliminates and avoids all those disadvantages inherent in the prior implements heretofore used for the same purpose.

Another object of this invention resides in the provision of a gaff for landing fish which is positively actuated to securely grip and hold fish without opportunity for the fish to break loose and be lost.

Still another object of this invention is the provision of a gaff for landing fish which is a small and compact device in construction and extremely simple and easy to use without complex operational requirements and without awkwardness and bulk.

A still further object of this invention lies in the provision of a gaff for landing fish which is substantially automatic in use and enables the ready and easy gaffing of fish as a one-hand operation in complement to the maintaining of a fishing line in taut condition to position the fish for easy grasping by the gaff.

Another and further object of this invention is the provision of a gaff for landing and boating fish having the attributes above described which is extremely simple and inexpensive of manufacture yet which is durable and sturdy in use.

Still further and additional objects and advantages of this invention will become more readily apparent when those skilled in the art read the following descriptions in the light of the accompanying drawings.

The nature of the present invention may be stated in general terms as comprising a fixed handle, a movable trigger assembly, a pair of serrated jaws pivotally secured to the fixed handle, linkage pivotally interconnecting the jaws with said movable trigger, and resilient means normally biasing said linkage and jaws to a closed position; whereby a snapping motion of the gaff will, by inertia, cause the jaws to open against the resilient bias preparatory to gripping a fish brought to boat on hook and line.

Referring now to the accompanying drawings in which like numerals designate similar parts throughout the several views.

Construction

Figures 3, 4:
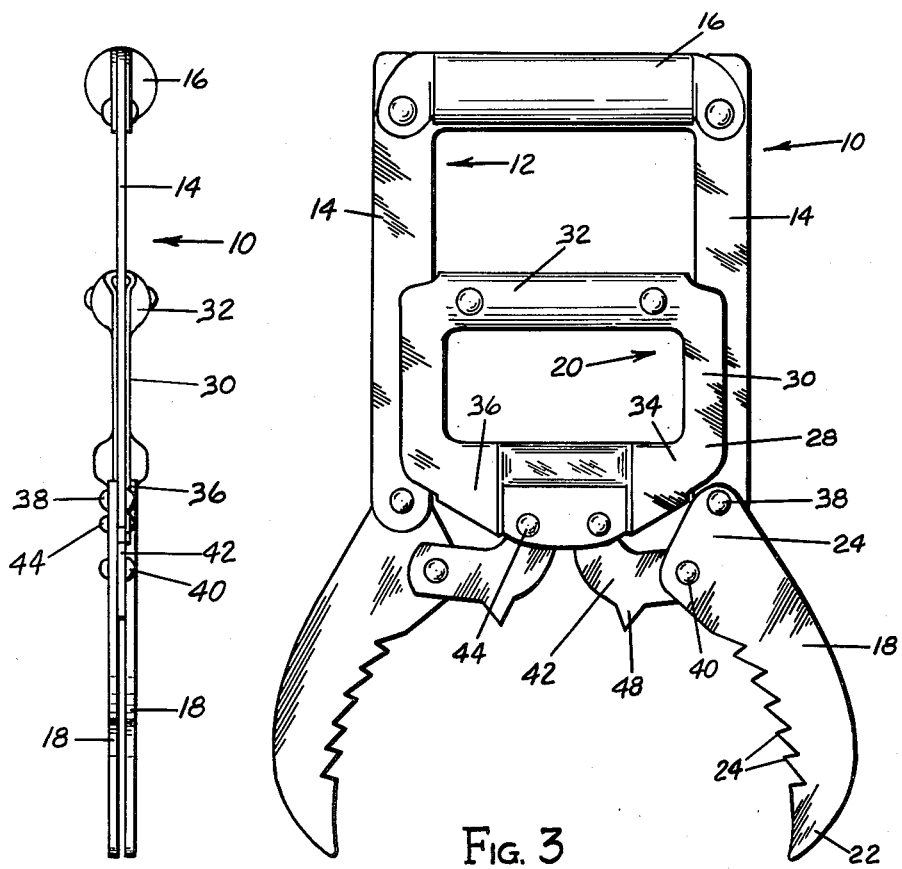
Fig. 3 is a view similar to Fig. 1 with the jaws illustrated in an open position.
Fig. 4 is a side elevation of the gaff illustrated in Fig. 3.
Figure 5:
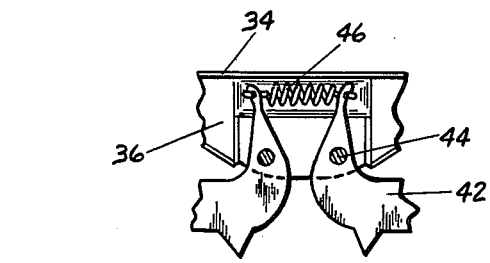
Fig. 5 is a view similar to Fig. 2 illustrating the spring structure with the jaws in open position as in Fig. 3.

Referring now to the accompanying drawings, and more particular to Fig. 3 wherein the gaff is shown with the jaws in an open position, the novel gripping gaff, generally designated at 10, consists of a handle assembly 12 which includes a pair of parallel, spaced side arms 14 interconnected across the upper pair of adjacent ends by a tubular handle bar 16.

The lower ends of the arms 14 of the handle assembly support, in pivotal relationship, a pair of gripping jaws 18 which have further linkage connection to a trigger assembly, generally designated at 20. The jaws 18, which are alike and mounted in opposed positions, are each of arcuate configuration having one generally pointed, tip end 22 and one relatively broad base end 24. The concave edges of each jaw member are toothed or serrated as at 26.

The trigger assembly 20 consists of a rectangular frame 28 having two parallel short side arms 30 of U-shaped cross sectional configuration which telescopically, laterally engage each about the inner edge of one of the arms 14 of the handle assembly to slidably mount the frame longitudinally between these arms and is movable relative to the tubular handle bar 16. Those ends of the side arms 30 disposed toward the handle bar 16 are interconnected by a trigger grip 32 while the opposed ends thereof are interconnected by a cross bar 34 which is a continuous, integral extension of the U-shaped side arms 30 having an area 36 centrally of its length of increased transverse width providing a recessed channel therein opening from the lower end of the cross bar.

Each of the jaws 18 is pivotally connected by a pin 38 to the lower end of one of the arms 14 of the handle assembly. The pin 38 extends through the jaw closely adjacent one end of the relatively broad base end thereof, while a second pin 40 pivotally interconnects the remote end of the broadened base end of the jaw to one end of a bell crank link 42 which extends inwardly from the jaw and then upwardly to position the second remote end thereof within the recessed channel defined by the broadened U-shaped cross arm 34 of the trigger assembly. The upper end of each of the bell crank links 42 is disposed within the channelled cross bar offset of the vertical centerline of the gaff in a direction of the jaw to which it is connected, and each link is pivotally attached by a third pin 44 to the cross arm 34 of the trigger handle assembly at a point intermediate the length of the second leg of the link and off center from the substantially perpendicular joinder of the two legs thereof.

The upper extended ends of the two bell links 42, within the confines of the recess channel of the cross arm 34, are interconnected by a coil spring 46 normally biasing the upper ends of the links toward one another.

To complete the gaff construction, the bell links 42 are each provided with a pointed spur 48 projecting outwardly from the generally perpendicular intersection of the two legs thereof in a direction approximating a continuation of the second described leg of each link.

Operation

Figure 1:
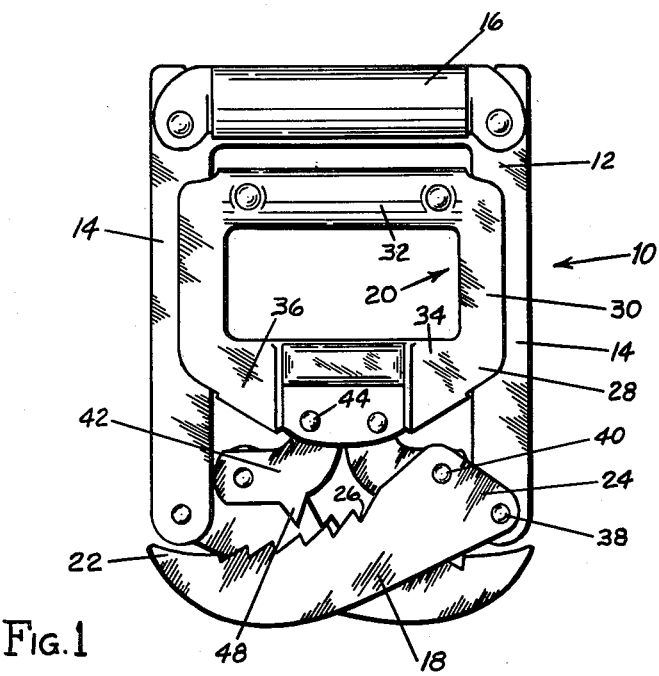
Fig. 1 is an elevational view of the gaff with the jaws in normal, closed position.
Figure 2:
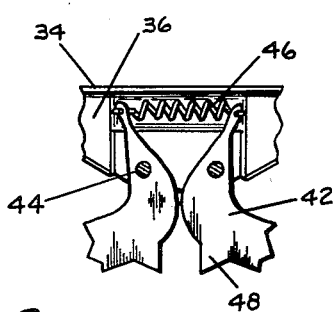
Fig. 2 is a fragmentary section illustrating the jaw holding spring structure.

Normally the gaff assumes the position shown in Fig. 1 of the drawings with the jaws 18 thereof biased to a closed, overlapped position under urging of the spring 46 acting to move them inwardly toward one another. Inward movement of the jaws 18 forces the trigger assembly, through the medium of links 42, upwardly within the handle assembly toward the handle bar 16 as shown in Fig. 1. Thus the gaff is normally maintained with the jaws in a closed, compact position without protruding extremities or components.

When the gaff is to be brought into use the handle bar 16 is grasped firmly in one hand, and the gaff is snapped outwardly or downwardly in a brisk manner. The inertia imparted to the trigger assembly by the snapping movement of the gaff is sufficient to throw the assembly downwardly against the tension of spring 46 causing the jaws to move through links 42 outwardly to the open position shown in Fig. 3.

Because of the off center location of the pivotal connections 44 relative to the normal apex of each of the bell links 42 the jaws achieve a position of dead center location relative to the tension of spring 46 when they are in a fully closed position, at which time the tension on spring 46 is of maximum bias. Thus, when the jaws have moved past their dead center position when opening outwardly the spring bias will tend to urge them to a full open position during the remainder of their opening movement. In order to bring the jaws to fish gripping position from a full open position, a squeezing motion between the trigger grip 32 and handle bar 16 will raise the trigger grip and bring the jaws to a gripping position relative to a fish disposed between the open jaws of the gaff.

Having thus described and fully explained the construction and operation of the novel fishing gaff constituting the present invention and having illustrated a satisfaction of all the advantages and attributes of this invention hereinbefore set forth, what I desire to claim is:

1. A fishing gaff including a handle having fixed depending arms in spaced relationship, a trigger assembly slidably mounted between said spaced arms and movable toward and away from the handle, a pair of jaws pivotally secured one to the lower end of each of said spaced arms, a pair of angular links each having one end pivotally secured to one of the jaws and pivotal attachments intermediate its length to said trigger assembly, the pivotal connections of the links to the jaws being located between the pivotal connections of the links to the trigger assembly and the pivotal connections of the jaws to the arms, the respective pivotal connections being arranged to assume a dead center relationship when the trigger is moved toward the handle and the jaws are in closed position, and spring means urging those ends of the links adjacent to and beyond their intermediate attachment to the trigger assembly, toward one another.

2. A fishing gaff including a handle having fixed depending arms in spaced relationship, a trigger assembly slidably mounted between said spaced arms and movable toward and away from the handle and having a vertically recessed lower end, a pair of jaws pivotally secured one to the lower end of each of said handle arms, a pair of angular links each having one end pivotally secured to one of the jaws and pivotal attachment intermediate its length to the lower end of the trigger assembly locating the second end thereof within the recessed lower end of the trigger assembly, the pivotal connections of the links to the jaws being located between the pivotal connections of the links to the trigger assembly and the pivotal connections of the jaws to the arms, the respective pivotal connections being arranged to assume a dead center relationship when the trigger is moved toward the handle and the jaws are in closed position, and spring means in the recessed lower end of the trigger assembly urging those ends of said links therein beyond their intermediate attachment to the trigger assembly, toward one another.

3. A fishing gaff including a handle having fixed depending arms in spaced relationship, a trigger assembly slidably mounted between said spaced arms and movable toward and away from the handle, a pair of arcuate jaws having relatively wide base ends pivotally secured adjacent one side of said base end to the lower end of each handle arm, a pair of angular links each having one end pivotally secured to the other side of the base end of each jaw, each link being pivotally secured intermediate its length to the trigger assembly, the pivotal connections of the links to the jaws being located between the pivotal connections of the links to the trigger assembly and the pivotal connections of the jaws to the arms, the respective pivotal connections being arranged to assume a dead center relationship when the trigger is moved toward the handle and the jaws are in closed position, and spring means interposed between the second ends of said links beyond their pivotal connection to the trigger assembly, biasing said last named link ends toward one another.

References Cited in the file of this patent
UNITED STATES PATENTS 2,482,576    Comstock    Sept. 20, 1949